US012585221B2

(12) United States Patent
Itoh

(10) Patent No.: US 12,585,221 B2
(45) Date of Patent: Mar. 24, 2026

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Jun Itoh, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/789,064

(22) Filed: Jul. 30, 2024

(65) Prior Publication Data

US 2025/0044730 A1 Feb. 6, 2025

(30) Foreign Application Priority Data

Aug. 4, 2023 (JP) ................................ 2023-127562

(51) Int. Cl.
*G03G 15/00* (2006.01)

(52) U.S. Cl.
CPC ..... *G03G 15/6508* (2013.01); *G03G 15/6582* (2013.01); *G03G 2215/00383* (2013.01); *G03G 2215/00569* (2013.01)

(58) Field of Classification Search
CPC ........... G03G 15/6508; G03G 15/6582; G03G 2215/00383; G03G 2215/00569
See application file for complete search history.

(56) References Cited

U.S. PATENT DOCUMENTS

2002/0110380 A1* 8/2002 Mcintyre ........... H04N 1/00578 399/9
2003/0005369 A1* 1/2003 Trelewicz .......... H04N 1/32144 714/44
2009/0122346 A1* 5/2009 Kamata ................ G06K 15/025 358/1.16
2018/0107146 A1* 4/2018 Shinohara .......... G03G 15/6552
2019/0263109 A1* 8/2019 Richards ............. B41F 16/0046
2020/0192268 A1* 6/2020 Wakana ............... G03G 15/655
2020/0374419 A1* 11/2020 Liefferink ............ H04N 1/6005
2021/0356894 A1* 11/2021 Nishikata ........... G03G 15/6558
2022/0072873 A1* 3/2022 Hoover ................ B41J 11/0045

FOREIGN PATENT DOCUMENTS

JP 2022110889 A 7/2022

* cited by examiner

*Primary Examiner* — David H Banh
(74) *Attorney, Agent, or Firm* — Canon U.S.A., Inc., IP Division

(57) ABSTRACT

A method of easily determining which sheet is conveyed from which sheet storage unit in a case where a test chart is printed on sheets conveyed from a plurality of sheet storage units is provided. The control method includes performing control to convey a first sheet from a first sheet storage unit, printing on the first sheet, based on that the first sheet is a sheet conveyed from the first sheet storage unit, a print test image and first identification information that identifies the first sheet storage unit, performing control to convey a second sheet from a second sheet storage unit, and printing on the second sheet, based on that the second sheet is a sheet conveyed, a print test image and second identification information that identifies the second sheet storage unit.

19 Claims, 9 Drawing Sheets

CONVENTIONAL

CONVENTIONAL

IMAGE FORMING APPARATUS, CONTROL METHOD FOR IMAGE FORMING APPARATUS, AND STORAGE MEDIUM

BACKGROUND

Field

The present disclosure relates to an image forming apparatus, a control method for the image forming apparatus, and a storage medium.

Description of the Related Art

In an image forming apparatus for forming an image on a sheet, a test chart print function for checking whether an image formation on a sheet is normally performed has been used.

Japanese Patent Application Laid-open No. 2022-110889 discusses a technique of conveying a sheet from each of a plurality of sheet storage units, printing a chart on the conveyed sheet, and performing an adjustment based on the printed chart.

With the test chart print function, an image to be printed for checking (hereinbelow, referred to as a test chart image) is printed on a sheet conveyed from each of a plurality of sheet storage units, and discharged continuously. Accordingly, it is difficult to determine which sheet is conveyed from which sheet storage unit.

SUMMARY

According to an aspect of the present disclosure, an image forming apparatus comprises a printing unit, and a control unit configured to control the printing unit to convey a first sheet from a first sheet storage unit, print on the first sheet, based on that the first sheet is a sheet conveyed from the first sheet storage unit, a print test image and first identification information that identifies the first sheet storage unit from which the first sheet was conveyed, convey a second sheet from a second sheet storage unit, and print on the second sheet, based on that the second sheet is a sheet conveyed from the second sheet storage unit, a print test image and second identification information that identifies the second sheet storage unit from which the second sheet was conveyed.

Further features of the present disclosure will become apparent from the following description of exemplary embodiments with reference to the attached drawings.

DESCRIPTION OF THE EMBODIMENTS

Hereinbelow, exemplary embodiments of the present disclosure will be described in detail with reference to the attached drawings. Note that the following exemplary embodiments are not intended to limit the present disclosure related to the range of the claims, and all the combinations of features described in the following exemplary embodiments are not necessarily essential to the solution of the present disclosure.

Figure 1:
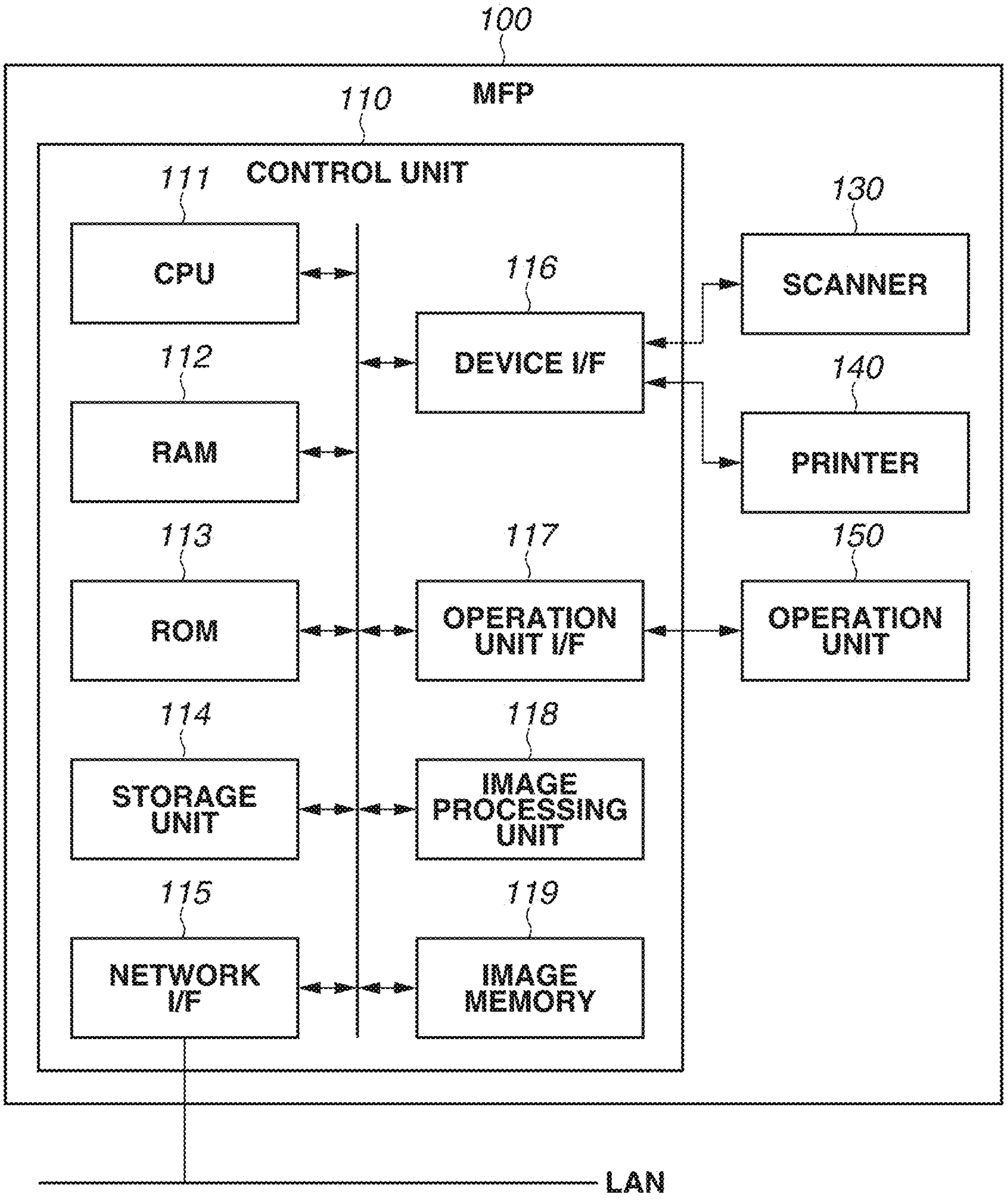
FIG. 1 is a block diagram illustrating a configuration of a multifunction peripheral (MFP).

FIG. 1 is a block diagram illustrating a configuration of a multifunction peripheral (MFP) 100 serving as an example of an image forming apparatus.

The MFP 100 includes a control unit 110, a scanner 130, a printer 140, and an operation unit 150. The scanner 130 is an example of an image input device. The printer 140 is an example of an image output device.

The control unit 110 is communicably connected with the scanner 130 and the printer 140. The scanner 130 scans a document based on a scan instruction from the control unit 110, and outputs the image data generated by the scanning to the control unit 110. The printer 140 performs printing based on the image data output from the control unit 110, in response to a print instruction from the control unit 110.

The operation unit 150 is provided with a touch panel and hard keys. The touch panel is composed of a touch panel sheet attached to a liquid crystal display unit. The operation unit 150 receives operations and instructions from a user through the touch panel sheet or the hard keys. Further, the operation unit 150 displays various kinds of information and image data on the liquid crystal display unit.

The control unit 110 includes a central processing unit (CPU) 111, a random access memory (RAM) 112, a read only memory (ROM) 113, a storage unit 114, a network interface (I/F) 115, a device I/F 116, an operation unit I/F 117, an image processing unit 118, and an image memory 119.

The CPU 111 collectively controls the MFP 100, by loading a program stored in the ROM 113 or the storage unit 114 into the RAM 112, and executing the loaded program. For example, the CPU 111 performs a reading control of reading a document by the scanner 130, and an output control of the printer 140.

The RAM 112 functions as a work area for the CPU 111.

The ROM 113 is a boot ROM to store a system boot program.

The storage unit 114 stores system software, image data, programs for controlling operations of the MFP 100, and the like.

The network I/F 115 is connected to a local area network (LAN), to control input/output of various kinds of information between the MFP 100 and an external personal computer (PC). In addition, descriptions will be given using a wired LAN as an example, but a wireless LAN may be used.

The device I/F 116 connects the scanner 130 and the printer 140 with the control unit 110, and performs asynchronous/asynchronous conversion of the image data.

The operation unit I/F 117 is an interface for connecting the operation unit 150 and the control unit 110, and outputs image data for display to the operation unit 150. Further, the operation unit I/F 117 transmits information received from a user via the operation unit 150 to the CPU 111.

The image processing unit 118 performs image processing on print data received via the LAN. Further, the image processing unit 118 performs image processing on image data input and output via the device I/F 116.

The image memory 119 is a memory for temporarily rasterizing image data to be processed by the image processing unit 118.

The MFP 100 described above performs a copy job of reading an image of a document using the scanner 130, and printing the image using the printer 140 based on the image data of the read document. Further, the MFP 100 performs a print job of receiving print data via the LAN, generating image data using the image processing unit 118 based on the received print data, and printing an image using the printer 140 based on the generated image data.

Further, the MFP 100 has a test chart print function of printing a test chart (image for print test) for an operator to check whether image printing on a sheet is normally performed. A specific pattern is printed on the test chart, and a user watches the pattern to check whether density unevenness or print defects exist.

The sheet used by the MFP 100 for printing is managed by an operator using a database called a cassette library. The cassette library is stored in the storage unit 114 or the RAM 112, and is read and written when needed by each software module.

Next, a configuration and an operation of the MFP 100 will be described.

Figure 2:
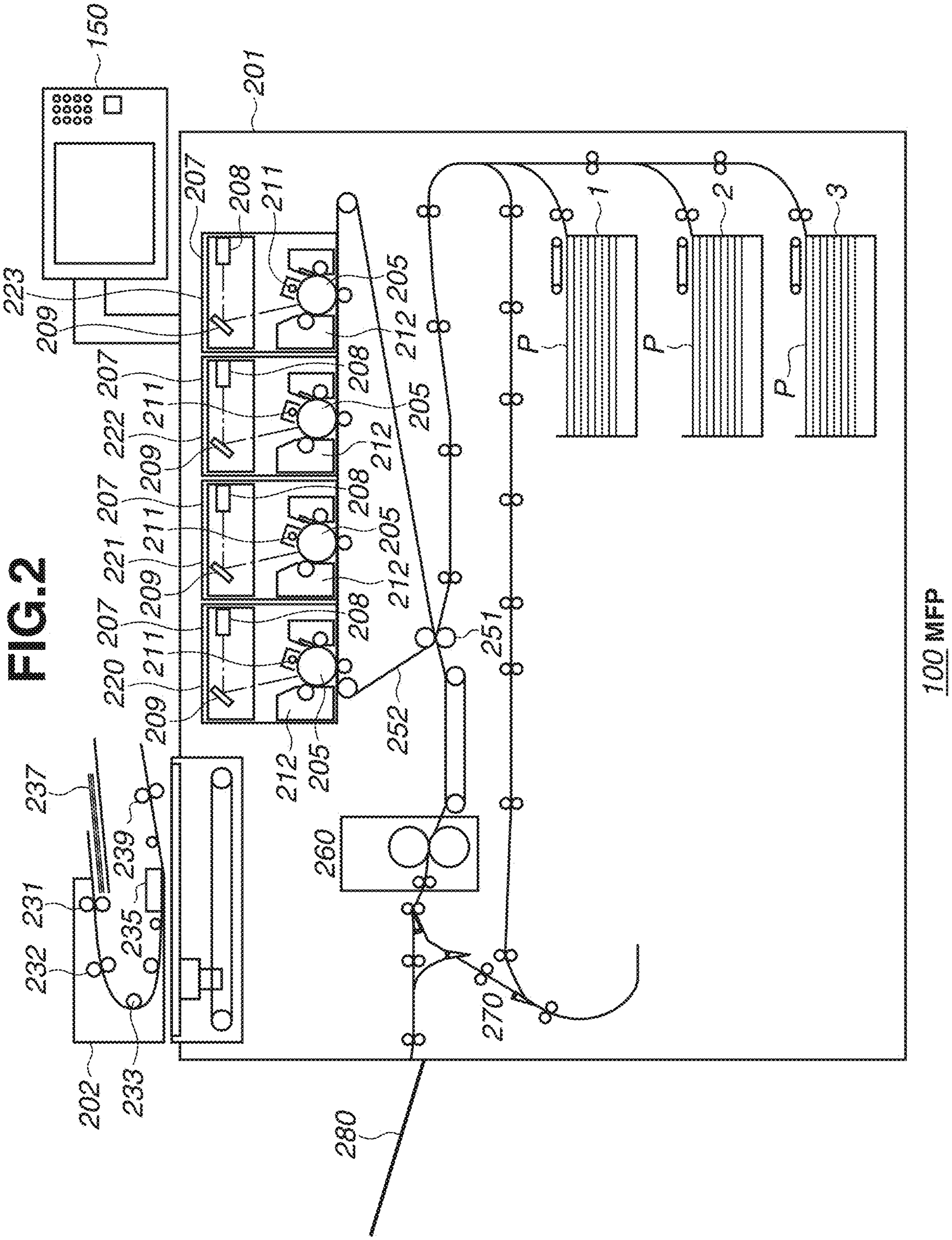
FIG. 2 is a cross-section diagram illustrating a configuration of the MFP.

FIG. 2 is a cross-section diagram illustrating a configuration of the MFP (image forming apparatus) 100 according to the present exemplary embodiment. As illustrated in FIG. 2, the MFP 100 has a housing 201. The housing 201 includes mechanisms for configuring an engine unit, an engine control unit for performing a print control by the mechanisms, and a control board containing portion for containing a printer controller.

As a mechanism configuring the engine unit, there is provided an optical processing mechanism for forming an electrostatic latent image on each of photosensitive drums 205 by scanning a laser beam, visualizing the electrostatic latent image, transferring each of the visualized electrostatic latent images on an intermediate transfer member 252 in an overlapped manner, and further transferring onto a sheet P a color image formed on the intermediate transfer member 252 by being transferred in an overlapped manner. Further, as other mechanisms configuring the engine unit, there are provided a fixing processing mechanism for fixing the toner image transferred onto the sheet P, a sheet feed processing mechanism for feeding the sheet P, and a sheet conveyance processing mechanism for conveying the sheet P. As the sheet feed processing mechanism, sheet feed cassettes 1, 2, and 3 are provided. The sheet conveyance processing mechanism can convey a sheet from any of the sheet feed cassettes 1, 2, and 3.

The optical processing mechanism includes a laser driver configured to drive so as to turn ON and OFF a laser beam emitted from a semiconductor laser (not illustrated) based on image data provided from a printer controller in each of laser scanner units 207. The laser beam emitted from the semiconductor laser is deflected by a rotatable polygonal mirror 208 in the scanning direction. The laser beam reflected in a main scanning direction is guided to each of the corresponding photosensitive drums 205 via a reflection polygonal mirror 209, and each of the photosensitive drums 205 is exposed to the laser beam in the main scanning direction. On the other hand, each of the electrostatic latent images charged by a primary charging device 211 and formed on the corresponding photosensitive drum 205 by the scanning exposure of the laser beam is visualized as a toner image by toner supplied by a development unit 212 described below. Then, the visualized toner image on each of the photosensitive drums 205 is transferred (primarily transferred) onto the intermediate transfer member 252 to which a voltage with an opposite polarity to the toner image is applied. In color image formation, respective color images are sequentially formed on the intermediate transfer member 252 by a yellow (Y) station 220, a magenta (M) station 221, a cyan (C) station 222, and a black (K) station 223. As a result, a full-color visible image is formed on the intermediate transfer member 252.

Next, the sheet P is conveyed from the sheet feed cassette 1, is pressure-contacted by a transfer roller 251 to the intermediate transfer member 252, and at the same time, a bias with a polarity opposite to the polarity of the toner is applied to the transfer roller 251. In this way, the visible image formed on the intermediate transfer member 252 is transferred (secondarily transferred) onto the sheet P conveyed in synchronization therewith by the sheet feed processing mechanism in a conveyance direction (sub-scanning direction) of the sheet P. The sheet S can be fed from the sheet feed cassette 2 or the sheet feed cassette 3. In addition, the sheet feed cassette is just an example of a sheet storage unit, and the sheet storage unit may be a manual feeding tray.

The toner transferred on the sheet P is heated and fused to be fixed on the sheet P as an image, when the secondary-transfer completed sheet P passes through a fixing device 260. In a case of two-sided printing, the sheet P passes through a reverse portion 270 to be reversed in a switchback manner, and is introduced into the transfer portion again to form a back side image on the back side of the sheet P. Then, the sheet P passes through the fixing device 260 in a similar manner as described above, the toner image on the sheet P is heated and fixed, and the sheet P is discharged to a sheet discharge tray 280. In this way, the print process is completed.

Further, the MFP 100 includes a scanner 202. The scanner 202 includes mechanisms configuring the scanner 202, a scanner control unit for controlling document reading processing (e.g., document conveyance processing) by each mechanism, and a control board containing portion for containing the scanner control unit.

As a mechanism configuring the scanner 202, the scanner 202 includes conveyance rollers 231 and 232 for conveying a document 237 placed on an automatic document feeder (ADF). In addition, the scanner 202 is provided with a detection sensor 233 for detecting the passage of the conveyed document, and a reading sensor 235 for reading a document image.

Figure 3:
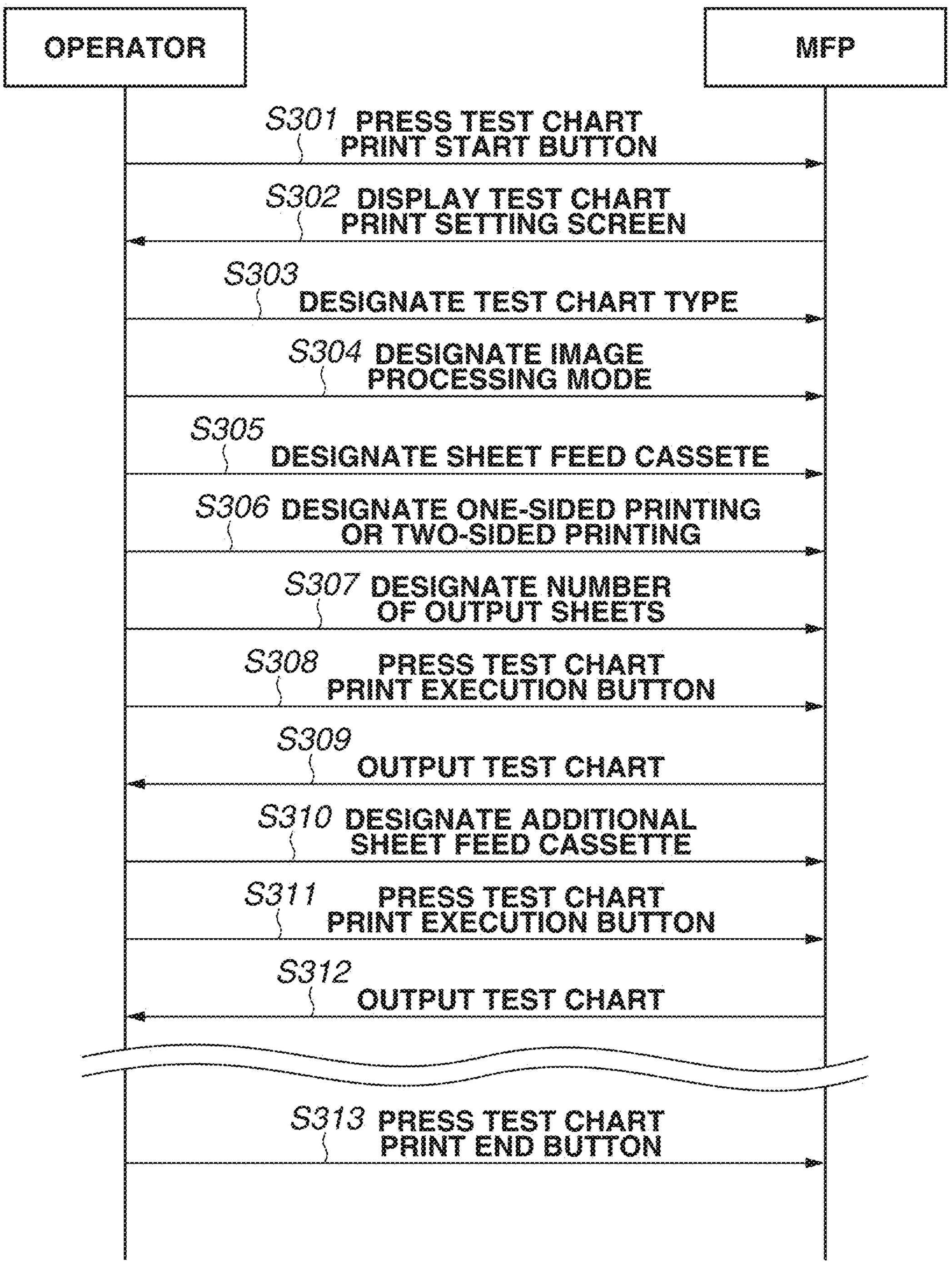
FIG. 3 is a sequence diagram illustrating a sequence of a test chart print.

Next, with reference to a sequence diagram in FIG. 3, a series of processing of a conventional test chart print will be described. In the sequence of the test chart print, communications are performed between an operator and the MFP 100.

In step S301, the operator presses a test chart print start button.

When the test chart print start button is pressed, the MFP 100 determines to start the test chart print, and in step S302, the MFP 100 displays a test chart print setting screen.

In step S303, the operator designates a type of the test chart to be printed in the test chart print.

In step S304, the operator designates an image processing mode for printing a halftone density image, such as error diffusion processing and screen processing.

In step S305, the operator designates a sheet feed cassette on which the test chart print is performed.

In step S306, the operator designates whether to perform the test chart print in one-sided printing or two-sided printing. In a case where the two-sided printing is designated, the MFP 100 prints the same test chart image designated in step S303 on both front and back surfaces.

In step S307, the operator designates the number of sheets of the test chart to be output. In a case where a plurality sheets to be output is designated, the MFP 100 conveys a plurality of sheets from the sheet feed cassette designated in step S305, and prints the test chart image.

When the settings of the test chart print is completed in steps S303 to S307, then in step S308, the operator presses a test chart print execution button. When the test chart print execution button is pressed, then in step S309, the MFP 100 executes printing the test chart. The output test charts are discharged on the sheet discharge tray 280 in a stacked manner.

In step S310, the operator additionally designates a sheet feed cassette different from the sheet feed cassette designated in step S305.

In step S311, the operator presses the test chart print execution button.

When the test chart print execution button is pressed, then in step S312, the MFP 100 conveys a sheet from the cassette designated in step S310, and executes the test chart print.

The operator repeatedly sets and executes the above-described operations until the output from all the cassettes on which the test chart print is performed has been completed. When the execution of the required test chart print is completed, in step S313, the operator presses a test chart print end button, to end the test chart print operation.

Figure 4:
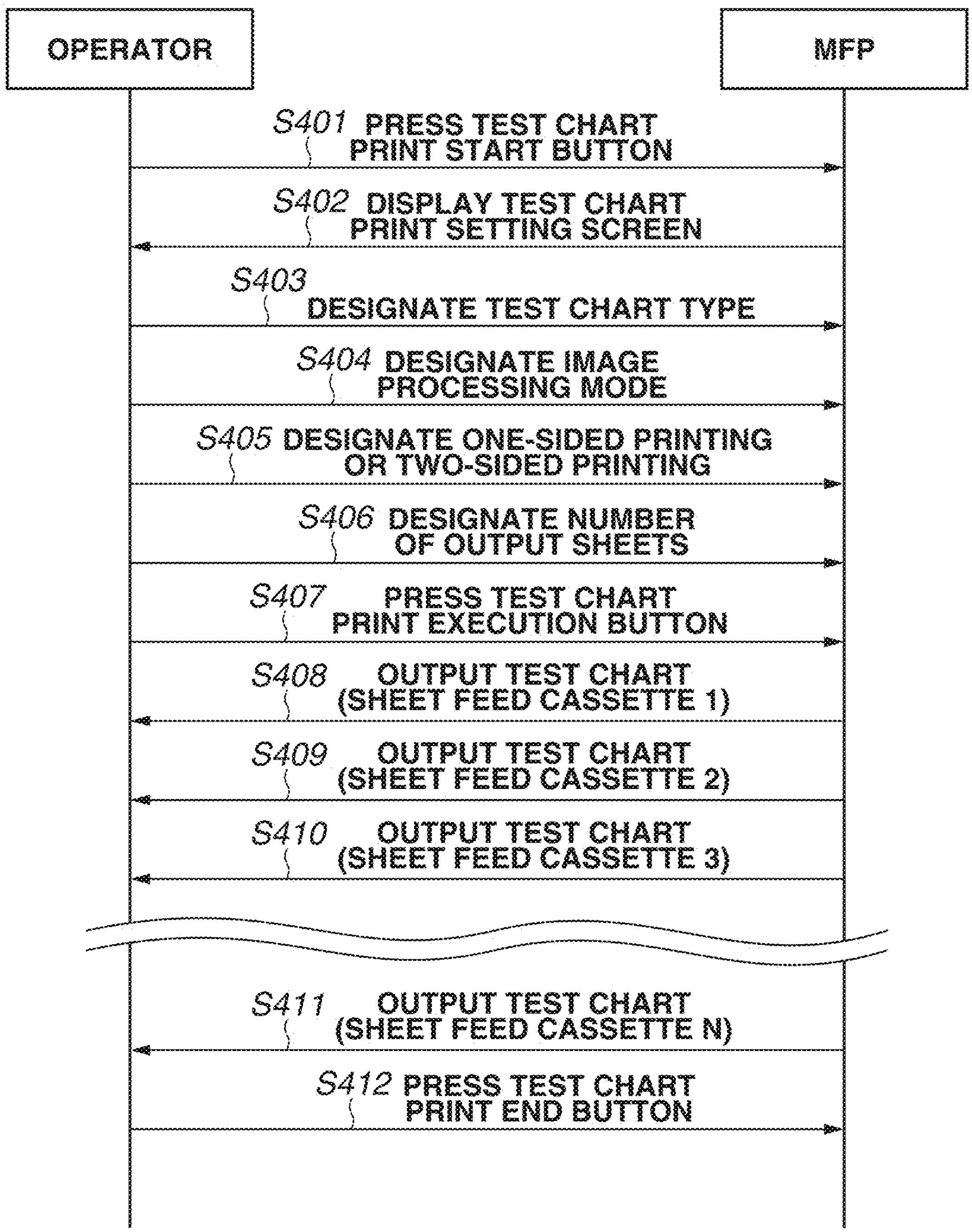
FIG. 4 is a sequence diagram illustrating a sequence of a test chart print according to a first exemplary embodiment.

FIG. 4 is a sequence diagram illustrating a series of processing in the test chart print according to a first exemplary embodiment. In the sequence of the test chart print, communications are performed between the operator and the MFP 100. In the test chart printing according to the present exemplary embodiment, a test chart is output from each of the sheet feed cassettes included in the MFP 100.

In step S401, the operator presses a test chart print start button.

When the test chart print start button is pressed, the MFP 100 determines to start the test chart print, and in step S402, the MFP 100 displays a test chart print setting screen on the operation unit 150.

In step S402, the CPU 111 of the MFP 100 displays the test chart print setting screen on the operation unit 150.

In step S403, the operator designates a type of the test chart to be printed in the test chart print. The test chart is, for example, a geometric figure such as a grid pattern, or an image with a density designated by the operator. Alternatively, the test chart may be a combination of these images.

In step S404, the operator designates an image processing mode for printing a halftone density image, such as error diffusion processing and screen processing. In this case, the operator designates a combination of setting values describing that the output of the test charts is performed from all the sheet feed cassettes. In a case where a combination of the setting values of the test chart type and the image processing mode is a specific combination, the MFP 100 determines that the operation of outputting the test charts from all the sheet feed cassettes is designated. In the present exemplary embodiment, the designation of outputting the test charts from all the sheet feed cassettes using the existing test chart type and the image processing mode is possible, but a dedicated mode designation button may be provided to enable the designation of the mode.

In step S405, the operator designates whether to perform the test chart print in one-sided printing or two-sided printing. In a case where the two-sided printing is designated, the MFP 100 prints the same test chart image designated in step S403 on both front and back surfaces.

In step S406, the operator designates the number of sheets of the test chart to be output. In a case where a plurality of sheets of the test chart to be output is designated, the MFP 100 conveys a plurality of sheets from the sheet feed cassette designated in step S405 to print the test chart image.

When the settings of the test chart print are completed in steps S403 to S406, then in step S407, the operator presses a test chart print execution button.

When the test chart print execution button is pressed, the CPU 111 of the MFP 100 starts printing the test charts in order from the sheet feed cassette 1. First, in step S408, the CPU 111 performs control to convey a sheet from the sheet feed cassette 1, print the test chart on the conveyed sheet, and output the printed sheet. Next, in step S409, the CPU 111 performs control to convey a sheet from the sheet feed cassette 2, print the test chart on the conveyed sheet, and output the printed sheet. Further, in step S410, the CPU 111 performs control to convey a sheet from the sheet feed cassette 3, print the test chart on the conveyed sheet, and output the printed sheet.

Then, in a case where the MFP 100 includes four or more sheet feed cassettes, in step S411, the CPU 111 performs control to convey a sheet from the last sheet feed cassette N mounted on the MFP 100, print the test chart on the conveyed sheet, and output the printed sheet. The output test charts are discharged on the same sheet discharge tray 280 of the printer 140 in a stacked manner.

In a case where a plurality of sheets of the test chart to be output is designated in step S406, the CPU 111 performs control to convey a sheet again in order from the sheet feed cassette 1, print the test chart on the conveyed sheet, and output the printed sheet. The CPU 111 repeats the operation until the designated number of sheets of the test chart are output.

When the execution of the required test chart print is all completed, in step S412, the operator presses a test chart print end button, to end the test chart print operation.

Figure 5:
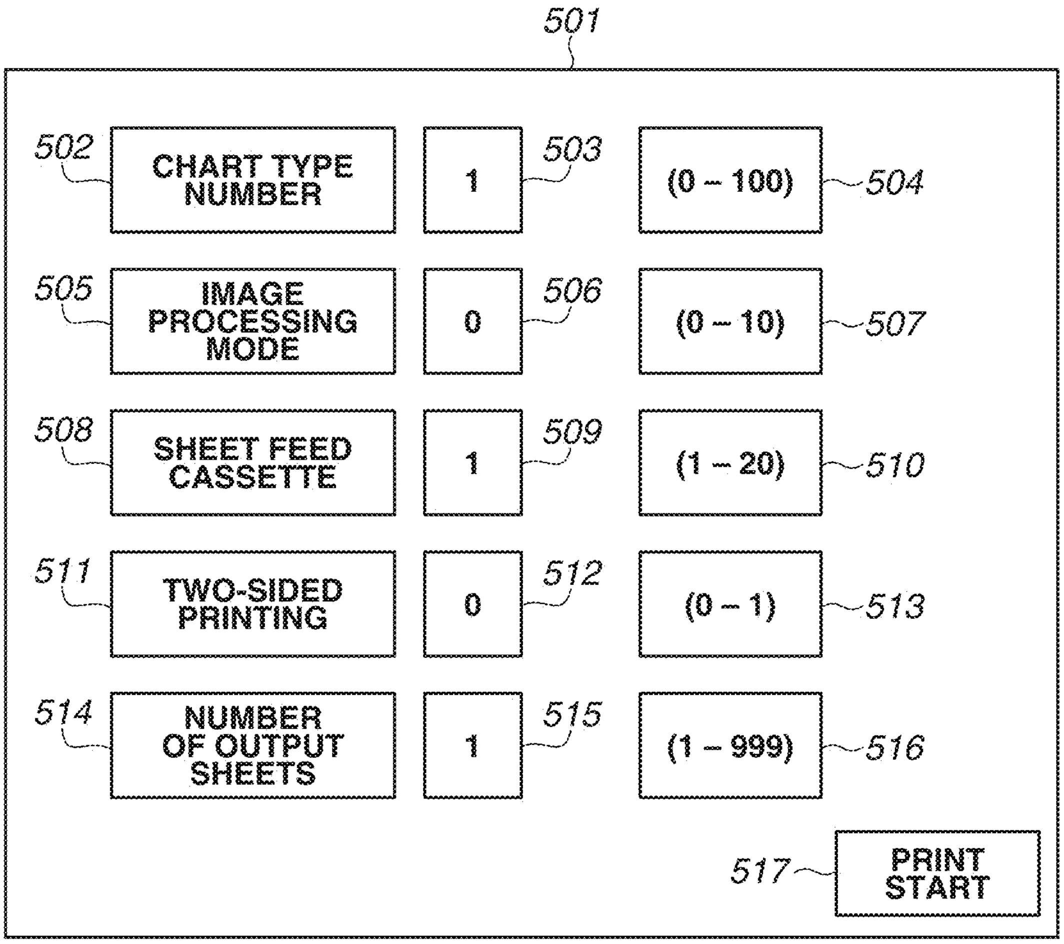
FIG. 5 is a diagram illustrating a screen displayed on an operation unit according to the first exemplary embodiment.

FIG. 5 is an example of the test chart print setting screen displayed on the operation unit 150 in step S402 in FIG. 4. In step S401, when the operator presses the test chart print start button, the CPU 111 displays a test chart print setting screen 501 on the operation unit 150.

A chart type number 502 is an item to set a test chart type. An entry field 503 is an entry field to enter a setting value, and a range 504 indicates a range possible to set the setting value. When "0" is entered in the entry field 503, a first image pattern test chart is set to be output, and when "1" is entered in the entry field 503, a second image pattern test chart is set to be output. In the setting of the chart type number 502, a mode for continuously printing a plurality of sheets of the test chart can be selected. When "80" is entered in the entry field 503, the mode for continuously printing the plurality of sheets of the test chart is set.

An image processing mode 505 is an item for setting an image processing mode. In the image processing mode 505, a type of halftone processing, such as error diffusion processing and screen processing, can be set. An entry field 506 is an entry field to enter a setting value, and a range 507 indicates a range possible to set the setting value. When "0" is entered in the entry field 506, the image processing mode is set to perform error diffusion processing, and when "1" is entered in the entry field 506, the image processing mode is set to perform screen processing. Further, when "10" is entered in the entry field 506, a mode to execute test chart printing from all the sheet feed cassettes is set.

A sheet feed cassette 508 is an item for setting a sheet feed cassette designated by the operator in step S305. An entry field 509 is an entry field to enter a setting value, and a range 510 indicates a range possible to set the setting value. The range 510 may be set so as to have the number of sheet feed cassettes mounted on the MFP 100 as an upper limit.

A two-sided printing 511 is an item for setting two-sided printing. An entry field 512 is an entry field to enter a setting value, and a range 513 indicates a range possible to set the setting value. The operator can set the two-sided printing by entering "1" in the entry field 512, and one-sided printing by entering "0" in the entry field 512.

A number of output sheets 514 is an item for setting the number of output sheets of the test chart. An entry field 515 is an entry field to enter a setting value, and a range 516 indicates a range possible to set the setting value.

A print start button 517 is the test chart print execution button to be pressed by the operator in step S407.

Figure 6:
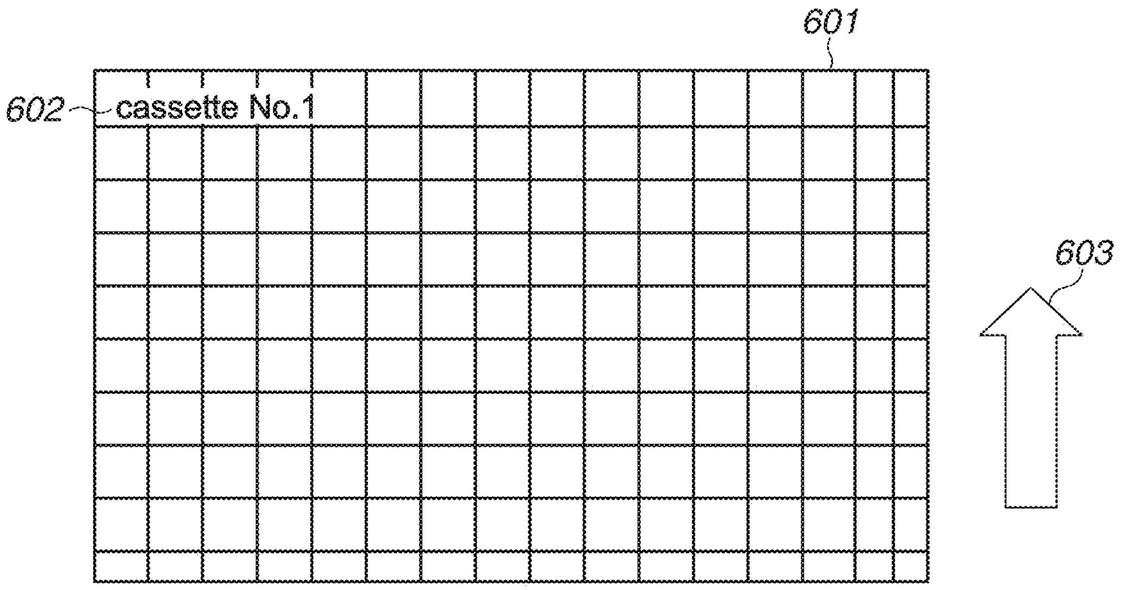
FIG. 6 is a diagram illustrating an example of a test chart according to the first exemplary embodiment.

FIG. 6 is an example of a test chart to be output in the test chart print according to the present exemplary embodiment.

A test chart 601 is an example of outputting a grid image as the test chart. As described above, the output test chart is not limited to the grid image in the present exemplary embodiment, and another geometric figure, an image with a density designated by the operator, and a combined image of a plurality of the images may be used.

A character string 602 is information describing a number of the sheet feed cassette, which is a conveyance source of the sheet on which the test chart is to be printed. In the test chart print according to the present exemplary embodiment, a character string with which the sheet feed cassette that has fed the sheet can be identified is printed on the test chart, and output. The character string to be printed may be only a number or a symbol of the sheet feed cassette not limited to the example in FIG. 6, as long as the sheet feed cassette can be identified.

An arrow 603 indicates a sheet conveyance direction when the MFP 100 prints the test chart. The character string 602 for identifying the sheet feed cassette can identify a print direction of the test chart by printing the character string 602 at a specific position in the sheet conveyance direction. FIG. 6 illustrates an example in which the character string 602 for identifying the sheet feed cassette is printed at an upper left portion of the test chart in the sheet conveyance direction.

Figure 7:
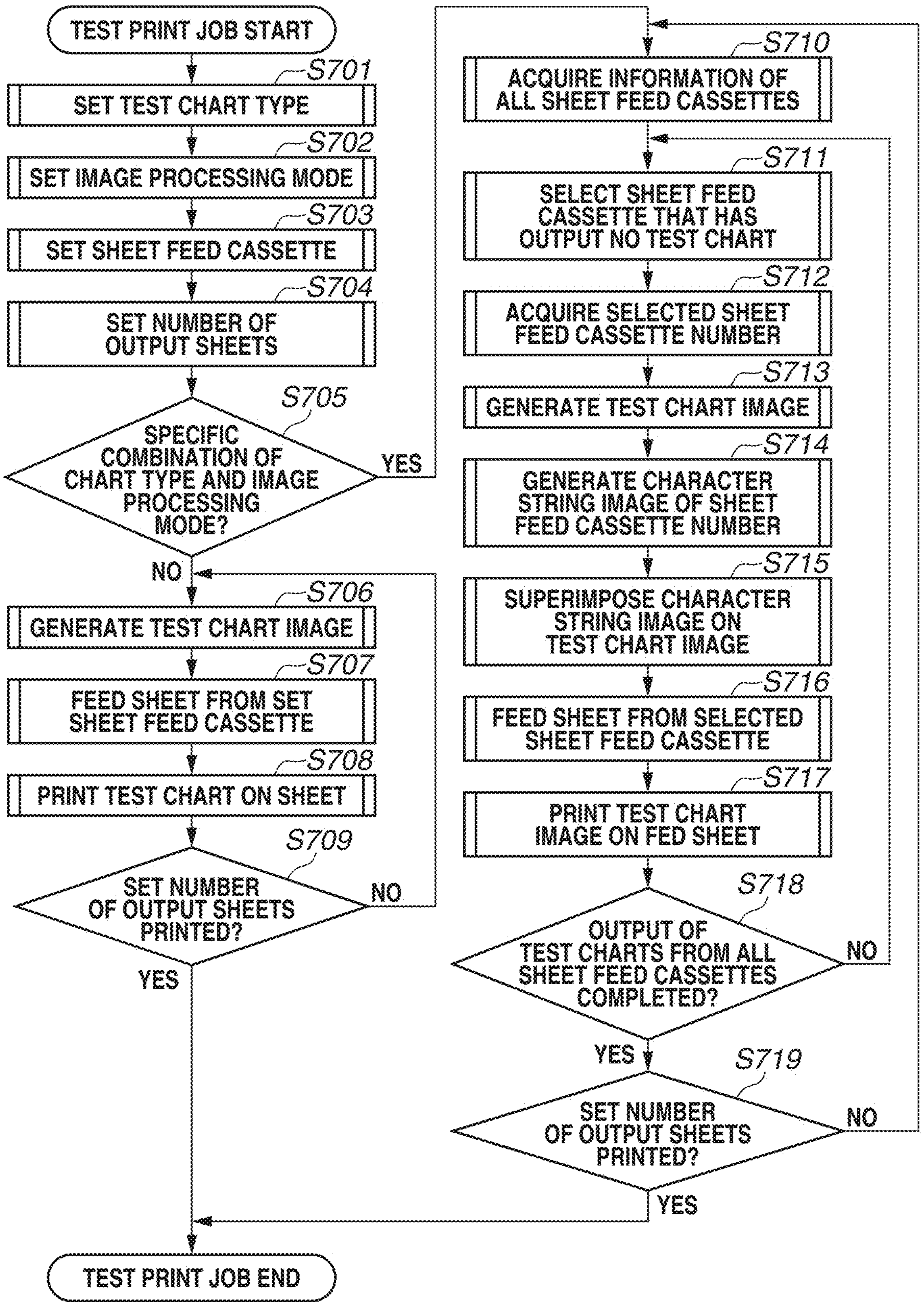
FIG. 7 is a flowchart illustrating a procedure of the test chart print according to the first exemplary embodiment.

FIG. 7 is a flowchart illustrating details of the test chart print processing, the sequence of which is illustrated in FIG. 4, according to the present exemplary embodiment. Each step in the flowchart in FIG. 7 is implemented by the CPU 111 loading a program stored in the ROM 113 into the RAM 112, and executing the loaded program.

In steps S701 to S704, the CPU 111 displays the test chart print setting screen 501 on the operation unit 150, and receives settings of the test chart print via the operation unit 150.

In step S701, the CPU 111 receives a setting of the test chart type, and stores it in the RAM 112.

In step S702, the CPU 111 receives a setting of the image processing mode, and stores it in the RAM 112.

In step S703, the CPU 111 receives a setting of the sheet feed cassette, and stores it in the RAM 112.

In step S704, the CPU 111 receives a setting of the number of output sheets of the test chart, and stores it in the RAM 112.

The execution order of steps S701 to S704 may be changed in an order received from the operator, and the steps of the items not changed from default values may be skipped. After completing the settings in steps S701 to S704, the operator presses the print start button (test chart print execution button) 517 via the operation unit 150.

When the print start button 517 is pressed, in step S705, the CPU 111 determines whether a combination of the chart type received in step S701 and the image processing mode received in step S702 is a specific combination. In a case where "80" is entered in the entry field 503 of the chart type number 502 and "10" is entered in the entry field 506 of the image processing mode 505, the CPU 111 determines that it is the specific combination. On the other hand, a combination other than the above-described combination is set, the CPU 111 determines that it is not the specific combination. In a case where the CPU 111 determines that it is the specific combination (YES in step S705), the CPU 111 advances the processing to step S710. In a case where the CPU 111 determines that it is not the specific combination (NO in step S705), the CPU 111 advances the processing to step S706. In addition, any one of the entry field 503 of the chart type number 502 and the entry field 506 of the image processing mode 505 may be used as a determination criterion. More specifically in this case, in a case where "80" is entered in the entry field 503 of the chart type number 502 (YES in step S705), the CPU 111 advances the processing to step S710, regardless of the value in the entry field 506 of the image processing mode 505. In a case where a value other than "80" is entered in the entry field 503 (NO in step S705), the CPU 111 advances the processing to step S706. In addition, the CPU 111 may control the processing in a following manner. In a case where "10" is entered in the entry field 506 of the image processing mode 505 (YES in step S705), the CPU 111 advances the processing to step S710, regardless of the value in the entry field 503 of the chart type number 502. In a case where a value other than "10" is entered in the entry field 506 (NO in step S705), the CPU 111 advances the processing to step S706.

In step S706, the CPU 111 generates a test chart image of the type set in step S701, performs image processing in the image processing mode set in step S702 by the image processing unit 118, and stores the processed test chart image into the image memory 119.

Then, in step S707, the CPU 111 controls the printer 140 to feed a sheet from the sheet feed cassette set in step S703.

In step S708, the CPU 111 reads out the test chart image generated in step S706 from the image memory 119 to transmit it to the printer 140, and prints the test chart image on the sheet fed in step S707.

In step S709, the CPU 111 determines whether output of the number of sheets of the test chart set in step S704 has been completed. In a case where the CPU 111 determines that the output of the set number of sheets has not been completed (NO in step S709), the CPU 111 advances the processing to step S706, and executes the processing in steps S706 to S708 again. In a case where the CPU 111 determines that the output of the set number of sheets has been completed (YES in step S709), the CPU 111 ends the test chart print processing in FIG. 7.

On the other hand, in the case where the processing proceeds from step S705 to step S710, in step S710, the CPU 111 acquires information of all the sheet feed cassettes mounted on the MFP 100.

Then, the processing proceeds to step S711, and the CPU 111 selects one sheet feed cassette that has not output the test chart yet.

In step S712, the CPU 111 acquires a sheet feed cassette number for identifying the sheet feed cassette. In the present exemplary embodiment, the sheet feed cassette number is an example of information that can identify the sheet feed cassette. The sheet feed cassette number may be a symbol or the like other than the number.

In step S713, the CPU 111 generates the test chart image, performs image processing on the generated test chart image by the image processing unit 118, and stores the processed test chart image (data) into the image memory 119. In the example of the present exemplary embodiment, in a case where the test chart output is performed from all the sheet feed cassettes, a predetermined test chart type and an image processing mode are used. However, even in the case where the test chart output is performed from all the sheet feed cassettes, the test chart type and the image processing mode may be made arbitrary settable, and the test chart image may be generated in the set test chart type and image processing mode.

In step S714, the CPU 111 generates an image of the character string 602 used to print the sheet feed cassette number acquired in step S712 on the test chart image, based on the sheet feed cassette number acquired in step S712. As described above, the character string image of the sheet feed cassette number may be only a number or a symbol as long as the sheet feed cassette can be identified.

In step S715, the CPU 111 superimposes the generated image of the character string 602 on the test chart image generated in step S713, and stores the synthesized image data into the image memory 119.

In step S716, the CPU 111 feeds a sheet from the sheet feed cassette selected in step S711.

In step S717, the CPU 111 reads out the test chart image data synthesized in step S715 from the image memory 119, transmits it to the printer 140, and causes the printer 140 to print the test chart image on the fed sheet.

Then, in step S718, the CPU 111 determines whether the output of the test charts from all the sheet feed cassettes mounted on the MFP 100 has been completed. In a case where the sheet feed cassette not outputting the test chart is left (NO in step S718), the CPU 111 returns the processing to step S711, selects again one sheet feed cassette that has not output the test chart yet, and performs the output processing of the test chart.

On the other hand, in a case where the output of the test charts from all the sheet feed cassettes has been completed (YES in step S718), the CPU 111 advances the processing to step S719. In step S719, the CPU 111 determines whether the output of the number of output sheets of the test chart set in step S704 has been completed. In a case where the output of the set number of sheets of the test chart has not been completed (NO in step S719), the CPU 111 returns the processing to step S710, and executes the processing of outputting the test charts from all the sheet feed cassettes.

In a case where the output of the set number of sheets has been completed (YES in step S719), the CPU 111 ends the test chart print processing.

As described above, it is possible to determine the sheet feed cassette from which the sheet of the print result is fed, by printing on the test chart a character string for identifying the sheet feed cassette. Further, it is possible to perform the test chart print of printing the test chart image from the plurality of sheet feed cassettes by one test chart print instruction. In this case, it is possible to determine the sheet feed cassette from which the sheet of the print result is fed, by printing on the test chart the character string for identifying the sheet feed cassette. In addition, in the present exemplary embodiment, the description is given of the test chart print function operated by the operator (service engineer), but the present exemplary embodiment can be applied to a function operated by a user.

In a second exemplary embodiment, with reference to FIGS. 8A, 8B, 8C, and 9, a description will be given of an exemplary embodiment according to the present disclosure in a case where a character string for identifying a body of the MFP 100 and a test chart print execution date and time are printed on the test chart, in addition to the character string for identifying the sheet feed cassette.

Details of the parts similar to those of the first exemplary embodiment will not be described, and differences from the first exemplary embodiment will be mainly described.

Figure 8A:
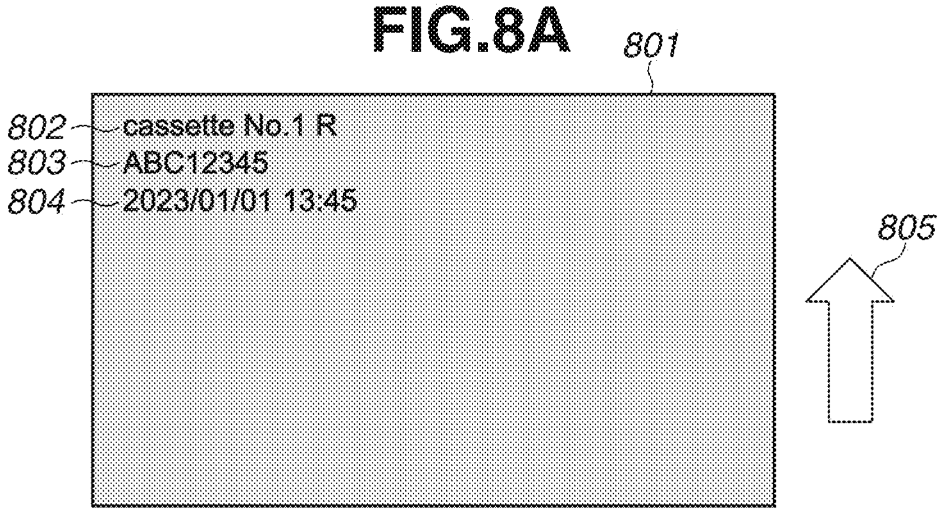
FIGS. 8A, 8B, and 8C are diagrams each illustrating a test chart according to a second exemplary embodiment.
Figure 8B:
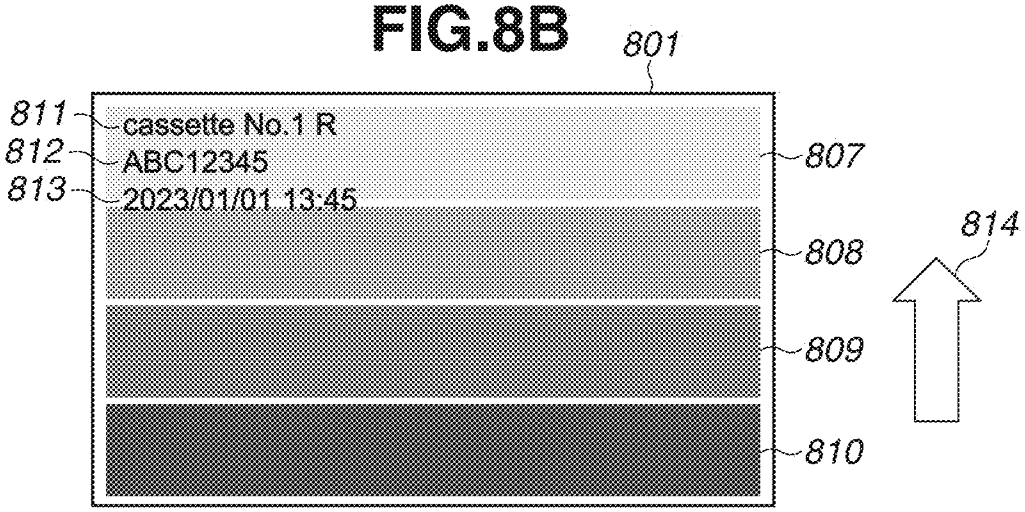
Figure 8C:
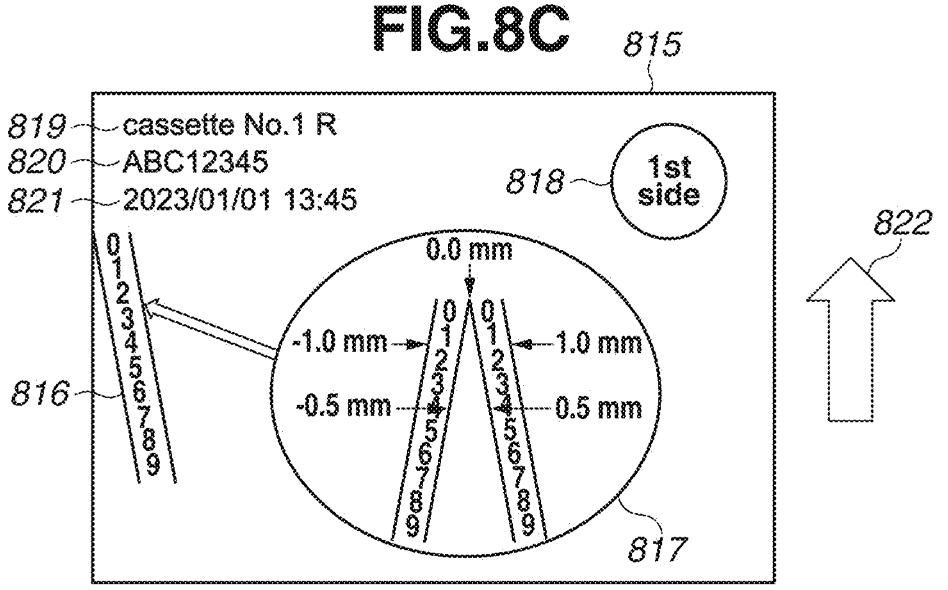

FIGS. 8A, 8B, and 8C are examples of the test chart output in a test chart print according to the present exemplary embodiment.

A test chart 801 in FIG. 8A illustrates an example of outputting a halftone density image as a test chart. As described above in the first exemplary embodiment, the test chart output in the present exemplary embodiment is not limited to a specific image, and a geometric figure such as a grid pattern, or a combined image of a plurality of images may be used.

A character string 802 is a character string describing a number of the sheet feed cassette that has fed the sheet on which the test chart is to be printed. The test chart print according to the present exemplary embodiment prints on the test chart a character string that can identify the sheet feed cassette that has fed the sheet, and outputs the printed test chart. The character string to be printed may be other than the example of the character string 802 illustrated in FIG. 8A, as long as it can identify the sheet feed cassette, and for example, only a number or a symbol of the sheet feed cassette may be printed.

A character string 803 is a character string describing a body number for identifying the body of the MFP 100. The test chart print according to the present exemplary embodiment is useful for identifying an MFP that has printed the test chart in an environment in which a plurality of MFPs is installed. Information other than the body number described by the character string 803 may be used as long as the information can identify the body of the MFP.

A character string 804 is a character string describing a date and time when the test chart print is executed. The character string 804 is useful to identify a date and a time when the printing is executed, in a case where a plurality of times of the test chart print is executed by the same MFP. In addition, the character string 804 is an example of time information, and the time information may be a character string in a format other than that expressed by the character string 804. For example, the time information may include only a time without including a date.

An arrow 805 indicates the sheet conveyance direction when the MFP 100 prints the test chart. The character string 802 for identifying the sheet feed cassette, the character string 803 of the body number of the MFP 100, the character string 804 describing the test chart printed date and time are always printed at predetermined positions in the sheet conveyance direction, to enable the test chart print direction to be identified. FIG. 8A illustrates an example in which the character strings (identification information) 802 to 804 are printed at an upper left portion of the test chart in the sheet conveyance direction.

A test chart 806 in FIG. 8B illustrates an example of outputting an image including four color halftone density images as a test chart. Like this example, the test chart to be output in the present exemplary embodiment may be not only a monochrome image but also a color image. An image 807 in FIG. 8B illustrates a halftone density image printed in yellow, and similarly an image 808 in magenta, an image 809 in cyan, and an image 810 in black. The test chart is not limited to the halftone density image, and may be a geometric figure such as a grid pattern with four colors, a combined image of a plurality of images, or a color figure in any one of yellow, magenta, cyan, and block (YMCK).

As in FIG. 8A, a character string 811 is a character string describing a number of the sheet feed cassette that has fed the sheet on which the test chart is to be printed. The test chart print according to the present exemplary embodiment prints on the test chart a character string that can identify the sheet feed cassette that has fed the sheet, and outputs it. The character string to be printed may be other than the example of the character string 811, as long as it can identify the sheet feed cassette, and for example, only a number or a symbol of the sheet feed cassette may be printed.

Similarly, a character string 812 is a character string describing a body number for identifying the body of the MFP 100.

In the test chart print according to the present exemplary embodiment, the body number is printed and output as the character string that can identify the MFP that has printed the test chart in an environment in which a plurality of MFPs is installed.

Information other than the body number described by the character string 812 may be used as long as the information can identify the body of the MFP.

A character string 813 is a character string describing a date and time when the test chart print is executed. The MFP 100 prints and outputs a date and a time as the character string 813 that can identify the date and the time when the print is executed, in a case where the same MFP executes a plurality of times of the test chart print. The date and time may be represented by a character string in a format other than that of the character string 813.

An arrow 814 indicates the sheet conveyance direction when the MFP 100 prints the test chart. The character string 811 for identifying the sheet feed cassette, the character string 812 describing the body number of the MFP 100, and the character string 813 describing the test chart printed date and time are always printed at predetermined positions in the sheet conveyance direction, to enable the test chart print direction to be identified. FIG. 8B illustrates an example in which the character strings (identification information) 811 to 813 are printed at an upper left portion of the test chart in the sheet conveyance direction.

A test chart 815 in FIG. 8C is an example of outputting an adjustment image as a test chart for adjusting a print position of an image. The adjustment image for the print position is an image generated as image data in advance and stored in the storage unit 114 of the MFP 100. The image is read from the storage unit 114 and printed on a sheet when the test print is executed. In this way, as the test chart output in the present exemplary embodiment, the image data may be output.

An image 816 in FIG. 8C is a scale for checking a printed position displacement. The image 816 is an image that enables a user to check the printed position displacement of the image, based on the output state of the image 816. An image 817 is an image for explaining a check method of the scale image 816 for checking a printed position. The image 817 is an image for explaining a determination method of the printed position displacement amount corresponding to the output state of the image 816 for checking a printed position. An image 818 is an image describing whether the printed surface of the test chart is a front surface, and with this image 818, it is possible to determine which surface of the output sheet on which the test chart is printed is a front surface, and which surface is a back surface. The test chart on which the image data is printed may be an image other than the print position adjustment image in the image 818, and it is also possible to print an adjustment image of an item other than the image print position, or an operation check image.

As in FIG. 8A, a character string 819 is a character string describing a number of the sheet feed cassette that has fed a sheet on which the test chart is to be printed. The test chart print according to the present exemplary embodiment prints on the test chart a character string that can identify the sheet feed cassette that has fed the sheet, and outputs it. The character string to be printed may be other than the example of the character string 819, as long as it can identify the sheet feed cassette, and for example, only a number or a symbol of the sheet feed cassette may be printed.

Similarly, a character string 820 is a character string describing a body number for identifying a body of the MFP 100. In the test chart print according to the present exemplary embodiment, the body number is printed and output as the character string that can identify the MFP that has printed the test chart in an environment in which a plurality of MFPs is installed. Information other than the body number described in the character string 820 may be used as long as it can identify the body of the MFP 100.

A character string 821 is a character string describing a date and time when the test chart print is executed. In the test chart print according to the present exemplary embodiment, the MFP 100 prints and outputs a date and time that can identify a date and a time when the print is executed, in a case where the same MFP executes a plurality of times of the test chart print. The date and time may be represented by a character string in a format other than that of the character string 821.

An arrow 822 indicates the sheet conveyance direction when the MFP 100 prints the test chart. The character string 819 for identifying the sheet feed cassette, the character string 820 describing the body number of the MFP 100, and the character string 821 describing the test chart printed date and time are always printed at predetermined positions in the sheet conveyance direction, to enable the test chart print direction to be identified. FIG. 8C illustrates an example in which the character strings (identification information) 819 to 821 are printed at an upper left portion of the test chart in the sheet conveyance direction.

Figure 9:
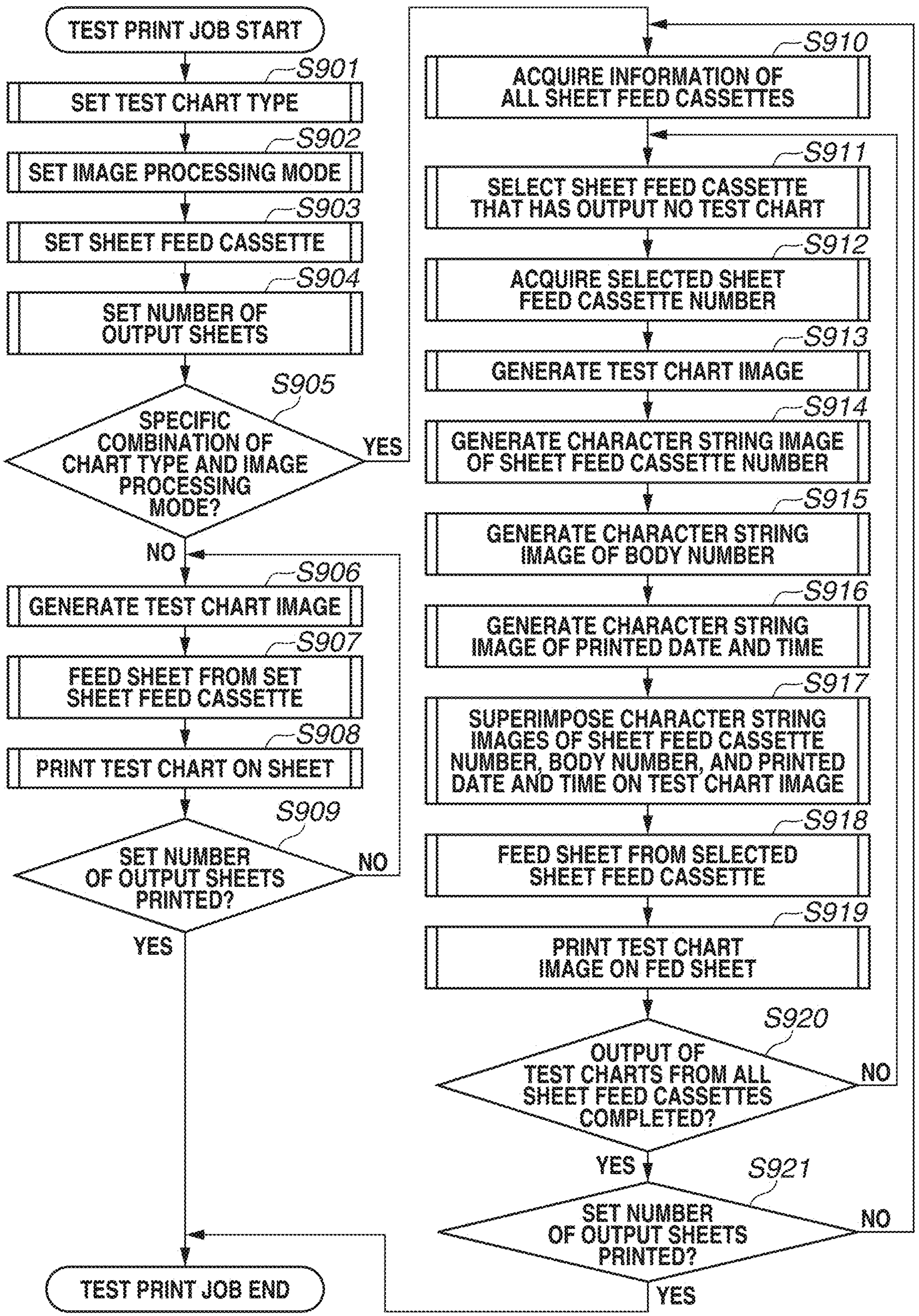
FIG. 9 is a flowchart illustrating a procedure of a test chart print according to the second exemplary embodiment.

FIG. 9 is a flowchart illustrating a detailed procedure of the test chart print processing according to the present exemplary embodiment. Each step in the flowchart in FIG. 9 is implemented by the CPU 111 loading a program stored in the ROM 113 into the RAM 112, and executing the loaded program.

In steps S901 to S904, the CPU 111 displays the test chart print setting screen 501 on the operation unit 150, and receives settings of the test chart print via the operation unit 150.

In step S901, the CPU 111 receives a setting of a test chart type, and stores it in the RAM 112.

In step S902, the CPU 111 receives a setting of an image processing mode, and stores it in the RAM 112.

In step S903, the CPU 111 receives a setting of a sheet feed cassette, and stores it in the RAM 112.

In step S904, the CPU 111 receives a setting of the number of output sheets of the test chart, and stores it in the RAM 112.

The execution order of steps S901 to S904 may be changed in an order received from the operator, and the steps of the items not changed from default values may be skipped. After the settings in steps S901 to S904 are completed, the operator presses the print start button (test chart print execution button) 517 via the operation unit 150.

When the print start button 517 of the operation unit 150 is pressed, in step S905, the CPU 111 determines whether a combination of the chart type received in step S901 and the image processing mode received in step S902 is a specific combination. In a case where “80” is entered in the entry field 503 of the chart type number 502 and “10” is entered in the entry field 506 of the image processing mode 505, the CPU 111 determines that it is the specific combination. On the other hand, a combination other than the above-described combination is set, the CPU 111 determines that it is not the specific combination. In a case where the CPU 111 determines that it is the specific combination (YES in step S905), the CPU 111 advances the processing to step S910. In a case where the CPU 111 determines that it is not the specific combination (NO in step S905), the CPU 111 advances the processing to step S906. In addition, only any one of the entry field 503 of the chart type number 502 and the entry field 506 of the image processing mode 505 may be used as a determination criterion. In this case, more specifically, in a case where “80” is entered in the entry field 503 of the chart type number 502 (YES in step S905), the CPU 111 advances the processing to step S910, regardless of the value in the entry field 506 of the image processing mode 505. In a case where a value other than “80” is entered in the entry field 503 (NO in step S905), the CPU 111 advances the processing to step S906. In addition, the CPU 111 may control the processing in the following manner. In a case where “10” is entered in the entry field 506 of the image processing mode 505 (YES in step S905), the CPU 111 advances the processing to step S910, regardless of the value in the entry field 503 of the chart type number 502. In a case where a value other than “10” is entered in the entry field 506 (NO in step S905), the CPU 111 advances the processing to step S906.

In step S906, the CPU 111 generates a test chart image of the type set in step S901, performs image processing on the generated test chart image in the image processing mode set in step S902 by the image processing unit 118, and stores the processed test chart image into the image memory 119.

Then, in step S907, the CPU 111 controls the printer 140 to feed a sheet from the sheet feed cassette set in step S903.

In step S908, the CPU 111 reads out the test chart image generated in step S906 from the image memory 119, transmits it to the printer 140, and prints the test chart image on the sheet fed in step S907.

In step S909, the CPU 111 determines whether the output of the number of sheets of the test chart set in step S904 has been completed. In a case where the CPU 111 determines that the output of the set number of sheets has not been completed (NO in step S909), the CPU 111 advances the processing to step S906, and executes the processing in steps S906 to S908 again. In a case where the CPU 111 determines that the output of the set number of sheets has been completed (YES in step S909), the CPU 111 ends the test chart print processing in FIG. 9.

On the other hand, in step S905, in a case where the CPU 111 determines that it is set to output the test charts from all the sheet feed cassettes (YES in step S905), the processing proceeds to step S910. In step S910, the CPU 111 acquires information of all the sheet feed cassettes mounted on the MFP 100. Then, the processing proceeds to step S911. In step S911, the CPU 111 selects a sheet feed cassette that has not output the test chart yet. In step S912, the CPU 111 acquires the sheet feed cassette number for identifying the selected sheet feed cassette. In the present exemplary embodiment, the sheet feed cassette number represents information that can identify the sheet feed cassette, and may be a symbol or the like other than the number. Further, the MFP 100 may be configured to have only one sheet feed cassette.

In step S913, the CPU 111 generates a test chart image, performs image processing on the generated test chart image by the image processing unit 118, and stores the processed test chart image (data) of the test chart 801 in the image memory 119. In the example of the present exemplary embodiment, in a case where the test chart output is performed from all the sheet feed cassettes, a predetermined test chart type and an image processing mode are used. However, even in the case where the test chart output is performed from all the sheet feed cassettes, the test chart type and the image processing mode may be made settable, and the test chart image may be generated in the set test chart type and image processing mode.

Next, in step S914, the CPU 111 generates an image of the character string 802 used for printing the sheet feed cassette number acquired in step S912 on the test chart image, based on the sheet feed cassette number acquired in step S912. As described above, the character string image of the sheet feed cassette number may be only a number or a symbol as long as the sheet feed cassette can be identified.

Next, in step S915, the CPU 111 generates an image of the character string 803 used for printing on the test chart image the body number for identifying the body of the MFP 100. As described above, the character string image of the body number may be a character string image representing information other than the body number, as long as it can identify the body of the MFP 100.

Next, in step S916, the CPU 111 generates an image of the character string 804 for printing on the test chart image the test chart print execution date and time. As described above, the date and time may be a character string in any format, as long as the character string can identify the date and the time when the print is executed.

Then, in step S917, the CPU 111 superimposes the character string 802 describing the sheet feed cassette number, the character string 803 describing the body number, and the character string 804 describing the printed date and the time, which are generated in steps S914 to S916, on the test chart image generated in step S913, and stores the synthesized image data into the image memory 119.

Next, in step S918, the CPU 111 feeds a sheet from the sheet feed cassette selected in step S911. For the sheet fed in step S918, the CPU 111 reads out the test chart image data synthesized in step S917 from the image memory 119, and transmits it to the printer 140. In step S919, the CPU 111 controls the printer 140 to print the test chart image on the fed sheet.

Then, in step S920, the CPU 111 determines whether the output of the test charts from all the sheet feed cassettes mounted on the MFP 100 has been completed. In a case where the sheet feed cassette that has not output the test chart yet is left (NO in step S920), the CPU 111 returns the processing to step S911, and selects again the sheet feed cassette that has not output the test chart yet, to perform the output processing of the test chart.

On the other hand, in a case where the output of the test charts from all the sheet feed cassettes has been completed (YES in step S920), the CPU 111 advances the processing to step S921. In step S921, the CPU 111 determines whether the output of the number of sheets of the output test chart set in step S904 has been completed. In a case where the output of the set number of sheets has not been completed (NO in step S921), the CPU 111 returns the processing to step S910, and executes again the processing of outputting the test charts from all the sheet feed cassettes. In a case where the output of the set number of sheets has been completed (YES in step S921), the CPU 111 ends the test chart print processing.

In this way, in the case where the test chart print for printing the test chart image from the sheet feed cassette is performed, it is possible to determine the MFP (image forming apparatus) that has executed the printing of the test chart image, the sheet feed cassette, and the print execution date and time. Further, it is possible to perform the test chart print of printing the test chart image from the plurality of sheet feed cassettes by one test chart print instruction. In this case, it is possible to determine the MFP (image forming apparatus) that has performed the test chart image printing, the sheet feed cassette, and the print execution date and time.

In addition, in the present exemplary embodiment, the description is given of the test chart print function operated by the operator (service engineer), but the present exemplary embodiment can be applied to a function operated by a user.

Other Exemplary Embodiment

In addition, in the above-described exemplary embodiments, the descriptions are given of the examples in which the sheets are fed from all the sheet feed cassettes in the case where the CPU 111 determines that the chart type and the image mode are a specific combination in step S705 or step S905. However, the present disclosure is not limited thereto, and the MFP 100 receives from a user an instruction of feeding the sheets from all the sheet feed cassettes and printing the test charts, and the CPU 111 may control the MFP 100 to perform the processing in step S710 or step S910 and the subsequent processing, based on the received instruction.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-127562, filed Aug. 4, 2023, which is hereby incorporated by reference herein in its entirety.

What is claimed is:

1. An image forming apparatus comprising:
- a conveying unit;
- a printing unit; and
- a control unit configured to:
  - control the conveying unit to convey a first sheet from a first sheet storage unit,
  - control the printing unit to print on the first sheet a test image including a pattern for a test and first identification information that identifies that the first sheet was conveyed from the first sheet storage unit,
  - control to the conveying unit to convey a second sheet from a second sheet storage unit, and
  - control to the printing unit to print on the second sheet the test image including the pattern and second identification information that identifies that the second sheet was conveyed from the second sheet storage unit.

2. The image forming apparatus according to claim 1, further comprising a reception unit configured to receive an instruction to print the print test image.

3. The image forming apparatus according to claim 1, further comprising a plurality of sheet storage units,
- wherein the control unit controls the conveying unit to convey a sheet from each of the plurality of sheet storage units, and
- wherein the control unit controls the printing unit to print on each the conveyed sheets the test image including the pattern and the identification information that identifies a respective one of each of the plurality of sheet storage units.

4. The image forming apparatus according to claim 1, wherein the control unit controls the printing unit to print third identification information that identifies the image forming apparatus on each of the first sheet and the second sheet.

5. The image forming apparatus according to claim 1, wherein the control unit controls the printing unit to further print time information describing a time when the test image including the pattern is printed on each of the first sheet and the second sheet.

6. The image forming apparatus according to claim 1, wherein the control unit controls the printing unit to further print information describing a front surface or a back surface of the test chart on each of the first sheet and the second sheet.

7. The image forming apparatus according to claim 1, further comprising an output control unit configured to control the first sheet and the second sheet to be output to a same sheet output unit.

8. The image forming apparatus according to claim 1, wherein the pattern of the test image is a grid pattern.

9. A control method for an image forming apparatus, the control method comprising:

performing control of a conveying unit to convey a first sheet from a first sheet storage unit;

printing, on the first sheet a test image including a pattern for a test and first identification information that identifies the first sheet was conveyed from the first sheet storage unit;

performing control of the conveying unit to convey a second sheet from a second sheet storage unit; and printing on the second sheet the test image including the pattern and second identification information that identifies the second sheet was conveyed from the second sheet storage unit.

10. A non-transitory computer-readable storage medium storing a program that when executed causes a computer to perform a control method for an image forming apparatus, the control method comprising:

performing control of a conveying unit to convey a first sheet from a first sheet storage unit;

printing, on the first sheet a test image including a pattern for a test and first identification information that identifies the first sheet was conveyed from the first sheet storage unit;

performing control of the conveying unit to convey a second sheet from a second sheet storage unit; and printing on the second sheet the test image including the pattern and second identification information that identifies the second sheet was conveyed from the second sheet storage unit.

11. The image forming apparatus according to claim 1, wherein the control unit is further configured to determine, based on user input, the pattern on each sheet.

12. The image forming apparatus according to claim 11, wherein the control unit is further configured to determine, based on user input, an image processing type applied when printing the test image, wherein, when it is determined that a particular pattern and particular image processing type are identified, the control unit performs a test print operation which conveys the first sheet from the first sheet storage unit and print the test image including the determined pattern and the first information using the determined image processing type, and conveys the second sheet from the second sheet storage unit and print the test image including the determined pattern and the second information using the determined image processing type.

13. The image forming apparatus according to claim 11, wherein the control unit is further configured to determine, based on user input, an image processing type applied when printing the test image, and, based on determining that that the pattern is a particular pattern and the image processing type is particular image processing type, the control unit controls the conveying unit to convey sheets from all sheet storage units and controls the printing unit to print test images using the particular image processing type and including the determined pattern and information identifying the sheet storage unit from which the sheet was conveyed.

14. The control method according to claim 9, further comprising determining, based on user input, the pattern on each sheet.

15. The control method according to claim 14, further comprising:

determining, based on user input, an image processing type applied when printing the test image, wherein, when it is determined that a particular pattern and particular image processing type are identified, performing a test print operation which includes conveying the first sheet from the first sheet storage unit and printing the test image including the determined pattern and the first information using the determined image processing type, and conveying the second sheet from the second sheet storage unit and printing the test image including the determined pattern and the second information using the determined image processing type.

16. The control method according to claim 14, further comprising determining, based on user input, an image processing type applied when printing the test image, and, based on determining that that the pattern is a particular pattern and the image processing type is particular image processing type, controlling the conveying unit to convey sheets from all sheet storage units and printing test images using the particular image processing type and including the determined pattern and information identifying the sheet storage unit from which the sheet was conveyed.

17. The non-transitory computer readable storage medium according to claim 10, wherein the program stored thereon, when executed, causes the computer to execute the control method that further comprises determining, based on user input, the pattern on each sheet.

18. The non-transitory computer readable storage medium according to claim 17, wherein the program stored thereon, when executed, causes the computer to execute the control method that determining, based on user input, an image processing type applied when printing the test image, wherein, when it is determined that a particular pattern and particular image processing type are identified, performing a test print operation which includes conveying the first sheet from the first sheet storage unit and printing the test image including the determined pattern and the first information using the determined image processing type, and conveying the second sheet from the second sheet storage unit and printing the test image including the determined pattern and the second information using the determined image processing type.

19. The non-transitory computer readable storage medium according to claim 17, wherein the program stored thereon, when executed, causes the computer to execute the control method that determining, based on user input, an image processing type applied when printing the test image, and, based on determining that that the pattern is a particular pattern and the image processing type is particular image processing type, controlling the conveying unit to convey sheets from all sheet storage units and printing test images using the particular image processing type and including the determined pattern and information identifying the sheet storage unit from which the sheet was conveyed.

* * * * *